3,110,725
PROCESS FOR OBTAINING ALPHA-BETA, DELTA-EPSILON UNSATURATED CARBOXYLIC COMPOUNDS
Gian Paolo Chiusoli, Novara, Italy, assignor to Montecatini Società Generale per l'Industria Mineraria e Chimica, Milan, Italy
No Drawing. Filed May 13, 1960, Ser. No. 28,813
Claims priority, application Italy May 19, 1959
14 Claims. (Cl. 260—476)

This application is directed to a new process of making 2,5-diene compounds of the general formula

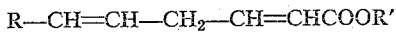

R—CH=CH—CH$_2$—CH=CHCOOR'

The invention constitutes an improvement in my processes for making 2,5-dienes by reacting allylic haloderivatives, viz. chloroderivatives, with acetylene, carbon monoxide, and hydroxylated compounds, such as water or alcohols, in the presence of nickel carbonyl. Said processes are described in my copending applications Serial No. 765,739, filed October 7, 1958, and Serial No. 862,067, filed December 28, 1959.

This application is directed to the discovery that the same compounds can be advantageously prepared by reacting allylic alcohols, acetylene, carbon monoxide and water or alcohols, in the presence of nickel carbonyl and hydrohalide, that is hydrochloric acid. The reaction is schematically represented as follows:

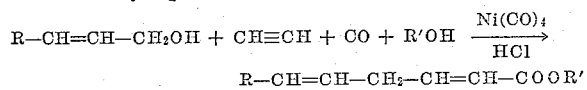

R—CH=CH—CH$_2$OH + CH≡CH + CO + R'OH $\xrightarrow[\text{HCl}]{\text{Ni(CO)}_4}$

R—CH=CH—CH$_2$—CH=CH—COOR' where R is H, a phenyl or an organic residue having from 1 to 10 carbon atoms. The R radical can be, for example, aliphatic or cycloaliphatic, and can be substituted, provided that no electronegative substituents, such as OH, Cl, COOH$_3$, etc., are present in a conjugated position with respect to a double bond. R' is H, a linear or a branched saturated aliphatic, cycloaliphatic or arylaliphatic residue having from 1 to 10 carbon atoms.

Primary allylic chloroderivatives are considered, the reaction of the secondary derivatives being subject to other limitations.

The reaction is a distinct improvement. The preparation of chloroderivatives, which in most cases had been made from the corresponding allylic alcohols by reacting with hydrochloric acid, now takes place directly in the reaction solution. Consequently, the hydrochloric acid is used only in the quantity strictly required to form the chloroderivative during the reaction, the hydrochloric acid being in turn partially freed from the reaction mixture, following the catalytic reaction. This facilitates operation under conditions such that the hydrochloric acid cannot have detrimental effects, such as causing secondary reactions, and unnecessary consumption of nickel carbonyl.

The allylic alcohols used as starting material are, in general, easily prepared by selective reduction of the corresponding unsaturated aldehydes. The reaction takes place most suitably between 35 and 65° C., though in many cases it is possible to operate outside this range.

The hydroxylated solvents, such as water or alcohols, are to be used preferably in large excess by weight, at least 50%, in respect to the chloroderivative. If water is used, it is advisable or preferable to mix it with a solvent when is inert under the reaction conditions, and facilitates the formation of a homogeneous solution. For this purpose, acetone is suitable. It is also advisable or preferable to use allylic alcohol in lower proportions than 20% in respect to the reacting mixture, in order to ensure the highest transformation.

Both carbon monoxide and acetylene can be used within wide limits, preferably in mixtures containing from 25 to 75% carbon monoxide in the acetylene.

The nickel carbonyl should preferably be used in excess with respect to the reacting chlorine, to ensure the continuity of the catalytic reaction. Since the reactive chlorine is formed in situ, by adding hydrochloric acid, the opportunity is apparent of graduating or controlling the addition of this acid so as to maintain a proper equilibrium in respect to the nickel carbonyl present.

The quantity of nickel carbonyl consumed will thus be lower than the stoichiometric amount corresponding to the formation of nickel chloride from the chlorine of the chloroderivative obtainable from the reacted allylic alcohol. The excess nickel carbonyl can be recovered from the gases by washing with the same solvents used in the reaction, or the nickel carbonyl can be recycled together with the reaction gases. In the following examples neither the recovery nor the recycling of the nickel carbonyl are described, these operations being already known for other processes through the technical literature, or the copending applications filed by applicant. The reactant gases are introduced, in a previously established ratio, of about 1:1, at a rate sufficient to maintain the reaction solution saturated with the mixture of the composition desired, thus avoiding both excess of acetylene, which causes secondary reactions, and excess of carbon monoxide, which may interrupt the reaction. The reaction course can be easily observed by the dark red coloring taken by the reaction solution. Any interruption of the reaction due to deficiency of the hydrochloric acid or of the nickel carbonyl is accompanied by a turning to green, or by a discoloration of the solution.

In practice, it is advisable to start with a solution containing allylic alcohol and the solvent. A current of carbon monoxide and acetylene is passed into the solution, and hydrochloric acid, in aqueous or alcoholic solution, and the nickel carbonyl are gradually dropped into it.

The products of the synthesis have a double bond conjugated with the carboxylic group, in the cis form. Their separation is carried out by known techniques, viz. as described in the copending applications.

A number of embodiments are presented below, without intent to limit the scope thereto.

*Example No. 1*

Into a 250 milliliter flask provided with a mechanical stirrer, refluxing cooler, thermometer, gas inlet tube and two separatory funnels, containing 100 g. methyl alcohol and 20 g. allyl alcohol respectively, a current of five liters per hour of carbon monoxide and five liters per hour of acetylene is passed at the temperature of 60° C. Over a period of 5 hours, 20 ml. nickel carbonyl, in 30 ml. methyl alcohol and 20 ml. of a 20% methyl solution of hydrochloric acid are introduced by letting them drop from the separating funnels.

The solution takes on a dark-red coloring, turning rapidly to green if nickel carbonyl and hydrochloric acid are not added.

After 6 hours a nitrogen stream is passed through the reaction mixture and the part passing up to 80° C., is distilled. By salting out the distillate with a saturated solution of calcium chloride a small quantity of product is obtained, which is added to that remaining after the distillation of the alcohol.

Upon taking up again the distillation residue with water, a solution of nickel chloride, containing 2.9 gr. of nickel, and an oil which is collected in ether are obtained. By distillation of the product, 9 gr. consisting of methyl ester of 2,5-hexadienoic acid are obtained, which pass over at 150–155° C. under atmospheric pressure.

*Example No. 2*

Under conditions analogous to those of the previous example, 20 g. allyl alcohol and 100 g. isopropyl alcohol are introduced into the flask.

Over a period of 4 hours and at a temperature of 45° C., 12 ml. nickel carbonyl in 20 ml. isopropyl alcohol and 10 ml. concentrated aqueous hydrochloric acid are dropped into the flask, while passing a stream of CO and $C_2H_2$ into it.

After the usual treatments, 17 g. of a fraction 170–180° C. containing the isopropyl 2,5-hexadienoate and 8.5 g. of residue are obtained by distillation at atmospheric pressure. 1.5 g. of nickel are thus transformed into nickel chloride.

*Example No. 3*

11.5 g. crotyl alcohol are introduced into the flask together with 120 g. acetone and 20 g. $H_2O$. At 55° C., and while carried in a current of carbon monoxide and acetylene, 15 ml. nickel carbonyl and 10 ml. concentrated hydrochloric acid are dropped into the flask over a period of 5 hours.

Upon distilling the product under an 11 mm. vacuum, after distilling off a head fraction, 8 g. are obtained at a boiling point of 114–117° C., consisting of 2,5-heptadienoic acid, and 4 g. of residue. The nickel consumed was equivalent to 2.5 g.

*Example No. 4*

15 grams of crotyl alcohol in 100 g. methyl alcohol in a current of four liters per hour of carbon monoxide and six liters per hour of acetylene are reacted with 12 ml. nickel carbonyl and 15 ml. 25% hydrochloric solution in methyl alcohol at 40° C. for 4 hours.

The distillation of the product yields 11.5 g. containing methyl 2,5-heptadienoate, which passes over at between 170 and 185° C. at atmospheric presure, and also 2.3 g. of residue.

The nickel, found as chloride, corresponds to 1.1 g.

*Example No. 5*

10 g. cinnamic alcohol in 100 g. methyl alcohol are reacted for 3 hours at 60° C., with 15 ml. nickel carbonyl and 15 ml. of a 25% methyl solution of hydrochloric acid, 3 l./h. of acetylene, and 3 l./h. of carbon monoxide being passed into the solution.

Upon distillation of the product, 4.5 grams of the methyl ester of 6-phenyl-2,5-heptadienoic acid are obtained, at a boiling point of 155–160° C./5 mm.

2.1 g. of nickel are transformed into chloride.

The invention is summarized as follows:

It is a proces for the preparation of compounds of the general formula R—CH=CH—$CH_2$—CH=CHCOOR', where R is H, a phenyl or an organic aliphatic or cycloaliphatic residue having from 1 to 10 atoms of carbon, which may also be substituted by inert groups under the reaction conditions, provided that these are not electronegative substituents in a conjugated position with a double bond, and R' is H or a saturated linear or branched aliphatic or cycloaliphatic or aryl-aliphatic residue having from 1 to 10 atoms of carbon, characterized in that the following compounds are made to react: alcohols having the R—CH=CH—$CH_2$OH formula, R having the above meaning; ROH hydroxylated compounds in excess of at least 50% in respect to the stoichiometric rate, drawn from the group including water and saturated linear or branched aliphatic, cycloaliphatic or aryl-aliphatic alcohols, having 1 to 10 atoms of carbon; mixtures of acetylene and carbon monoxide containing from 25 to 75% carbon monoxide; nickel carbonyl; and hydrochloric acid, the latter being preferably less than that needed for complete conversion of the nickel carbonyl, at temperatures ranging between 35 and 65° C., and further in that the operation is carried out with suitable solvents to facilitate the formation of a homogeneous solution of the reagents, and also in that the operation is carried out with a percentage of allyl alcohols in the mixture lower than 20% by weight.

Hydrochloric acid is preferred. There is no particular advantage in using the more expensive hydrogen bromide or hydrogen iodide.

The disclosed products, the dienic mono-carboxylic acids and esters are useful, after isomerization with alkali, to form conjugated dienes in the field of drying oils through Diels-Alder syntheses, for example by reaction with maleic anhydride. Note the text by Kirk-Othmer, Encyclopedia of Chemical Technology, New York, 1954, vol. 5, page 277 and following. In particular, the herein disclosed hexadienoic acid and its esters are readily isomerized to sorbic acid and its esters, which are monocarboxylic conjugated dienes, and have many known art uses. The heptadienoic acid and its esters are similarly applicable. For example, the 2,4-acid is obtained by treating the 2,5-heptadienoic acid with dilute aqueous alkali such as sodium hydroxide at ordinary or slightly elevated temperatures.

Also, the double bonds of said diene compounds are hydrogenated with hydrogen under a few atmospheres pressure, in single or two-stage processes, in the presence of ordinary hydrogenation catalysts, such as Raney nickle or palladium, at ordinary or slightly elevated temperatures, to yield the corresponding fully saturated or the mono-diene compounds, which have conventional uses described, for close homologues thereof, in prior patents and the literature. Hydrogenation processes similar to those described in my application Serial No. 765,734 may be used.

Moreover, the 2,5-dienoic acids are directly utilizable in the preparation of mixed esters of cellulose, the —OH groups of the cellulose being esterified in greater part by acetic acid and to a lesser extent by the said dienic acids. The so obtained mixed cellulose esters are utilized in manufacturing films, lacquers, moulding resins, etc., by procedures that are common knowledge in said fields.

Another field of use of the 2,5-dienoic acids and esters is to obtain copolymers with butadiene, which are useful to obtain resins.

The hydrogenated products can be esterified with pentaerythrite, to provide plasticizers.

The fatty acids prepared here have other obvious uses, similar to those described in said Kirk-Othmer text.

The conjugated dienes have other obvious art uses by Diels-Alder condensation, for example, to make known types of polycarboxylic intermediates for polyester and polyamide resins.

I claim:

1. A process of making an alpha-beta, delta-epsilon dienic aliphatic carboxylic acid ester according to the following reaction scheme:

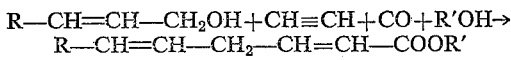

comprising reacting a monohydric alcohol having from one to ten carbon atoms of the formula R'OH in which R' is a hydrocarbon radical free of non-benzenoid unsaturation taken from the group consisting of alkyl, cycloalkyl, and aryl substituted alkyl; an allylic alcohol of the formula R—CH=CH—$CH_2$OH in which R is a radical taken from the class consisting of hydrogen, and hydrocarbon radicals free of non-benzenoid unsaturation of the group consisting of alkyl and phenyl radicals having from up to ten carbon atoms; the reaction being carried out at about 15° to 80° C. in the presence of nickle carbonyl and hydrochloric acid; the said monohydric alcohol being employed in excess of the stoichiometric amount, by at least 50%; said allylic alcohol being present in an amount less than 20% by weight of the reaction mixture; the hydrochloric acid being employed in an amount not more than that stoichiometrically required to convert the said allylic alcohol to the corresponding allylic chloride; a current of carbon monoxide and acetylene being passed into a solution of the allylic alcohol and said monohydric alcohol, the carbon monoxide being about 25 to 75% of the combined acetylene and carbon monoxide; the hydrochloric acid and nickle carbonyl being gradually dropped into the reaction mixture; and recovering said dienic aliphatic carboxylic acid ester.

2. The process of claim 1, for making a lower alkanol ester of 2,5-hexadienoic acid, the monohydric alcohol being an alkanol; the allylic alcohol being allyl alcohol.

3. A process of making the methyl ester of 2,5-hexadienoic acid, comprising reacting methyl alcohol, allyl alcohol, acetylene, carbon monoxide, hydrochloric acid, and nickel carbonyl, the reaction being carried out at about 15° to 80° C., the methyl alcohol being employed in excess of the stoichiometric amount by at least 50%; the allyl alcohol being present in an amount less than 20% by weight of the reaction mixture; the hydrochloric acid being employed in an amount not more than that stoichiometrically required to convert the allyl alcohol to allyl chloride; a current of carbon monoxide and acetylene being passed into a solution of allyl alcohol and methyl alcohol; the hydrochloric acid and nickel carbonyl being gradually dropped into the reaction mixture.

4. A process of making the isopropyl ester of 2,5-hexadienoic acid, comprising reacting isopropyl alchocol, allyl alcohol, acetylene, carbon monoxide, hydrochloric acid, and nickel carbonyl; the reaction being carried out at about 35° to 65° C.; the isopropyl alcohol being employed in excess of the stoichiometric amount by at least 50%; the allyl alcohol being present in an amount less than 20% by weight of the reaction mixture; the hydrochloric acid being employed in an amount not more than that stoichiometrically required to convert the allyl alcohol to allyl chloride; a current of carbon monoxide and acetylene being passed into a solution of allyl alcohol and isopropyl alcohol; the hydrochloric acid and nickel carbonyl being gradually dropped into the reaction mixture.

5. A process of making 2,5-heptadienoic acid, comprising reacting crotyl alcohol, water, acetylene, carbon monoxide, hydrochloric acid and nickel carbonyl, the reaction being carried out at about 15° to 80° C.; the water being employed in excess of the stoichiometric amount by at least 50%; the crotyl alcohol being present in an amount less than 20% by weight of the reaction mixture; the hydrochloric acid being employed in an amount not more than that stoichiometrically required to convert the crotyl alcohol to crotyl chloride; a current of carbon monoxide and acetylene being passed into a mixture of water and crotyl alcohol; the hydrochloric acid and nickel carbonyl being gradually dropped into the reaction mixture.

6. The process of claim 5, the water and crotyl alcohol being mixed with acetone.

7. A process of making methyl ester of 2,5-heptadienoic acid, comprising reacting crotyl alcohol, methyl alcohol, acetylene, carbon monoxide, hydrochloric acid, and nickel carbonyl, the reaction being carried out at about 15° to 80° C., the methyl alcohol being employed in excess of the stoichiometric amount by at least 50%; the crotyl alcohol being present in an amount less than 20% by weight of the reaction mixture; the hydrochloric acid being employed in an amount not more than that stoichiometrically required to convert the crotyl alcohol to crotyl chloride; a current of carbon monoxide and acetylene being passed into a solution of crotyl alcohol and methyl alcohol; the hydrochloric acid and nickel carbonyl being gradually dropped into the reaction mixture.

8. The process of claim 1, for making an alkanol ester of 2,5-heptadienoic acid; the monohydric alcohol being an alkanol; the allylic alcohol being crotyl alcohol.

9. The process of claim 1, for making an alkanol ester of 6-phenyl-2,5-hexadienoic acid; the monohydric alcohol being an alkanol; the allylic alcohol being cinnamic alcohol.

10. The process of claim 1, for making the methyl ester of 6-phenyl-2,5-hexadienoic acid; the monohydric alcohol being methanol; the allylic alcohol being cinnamic alcohol.

11. A process of making an alpha-beta, delta-epsilon dienic aliphatic carboxylic acid, according to the following reaction scheme:

R—CH=CH—CH₂OH + CH≡CH + CO + HOH

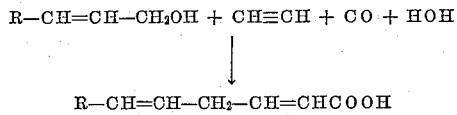

R—CH=CH—CH₂—CH=CHCOOH comprising reacting water, an allylic alcohol of the formula R—CH=CH—CH$_2$OH in which R is a radical taken from the group consisting of hydrogen, and hydrocarbon radicals free of non-benzenoid unsaturation of the group consisting of alkyl and phenyl radicals having from up to ten carbon atoms; the reacting being carried out at about 15° to 80° C. in the presence of nickel carbonyl and hydrochloric acid; the water being employed in excess of the stoichiometric amount by at least 50%; said allylic alcohol being present in an amount less than 20% by weight of the reaction mixture; the hydrochloric acid being employed in an amount not more than that stoichiometrically required to convert said allylic alcohol to the corresponding allylic chloride; a current of carbon monoxide and acetylene being passed into a mixture of the allylic alcohol and water, the carbon monoxide being about 25 to 75% of the combined acetylene and carbon monoxide, the hydrochloric acid and nickel carbonyl being gradually dropped into the reaction mixture; and recovering said dienic aliphatic carboxylic acid.

12. The process of claim 11, the allylic alcohol and water being mixed with an organic solvent which is inert in the reaction and forms a homogeneous mixture with said alcohol and water.

13. The process of claim 11, the reaction being at about 35° to 65° C.

14. The process of claim 1, the reaction being at about 35° to 65° C.

References Cited in the file of this patent

UNITED STATES PATENTS 2,778,848    Neuman et al.        Jan. 22, 1957

FOREIGN PATENTS 713,325    Great Britain        Aug. 11, 1954
930,368    France        Jan. 23, 1948
854,948    Germany        Nov. 10, 1952
856,294    Germany        Nov. 20, 1952

OTHER REFERENCES

Reppe et al.: "Annalen der Chemie," vol. 582, pages 1–37 (1953).

Royals: "Advanced Organic Chemistry," page 537 (1954) (Prentice Hall).

Acrylic Esters. "Synthesis From Acetylene and Nickel Carbonyl," Final Report No. 358, Item No. 22, British Intelligence Objectives Sub-Committee, London, H. M. Stationery Office, 12 pages (no longer restricted).